United States Patent [19]

Ellinger

[11] Patent Number: 4,677,305

[45] Date of Patent: Jun. 30, 1987

[54] OPTO-ACOUSTIC FUEL QUANTITY GUAGING SYSTEM

[75] Inventor: S. Michael Ellinger, Ferrisburg, Vt.

[73] Assignee: Simmonds Precision Products, Inc., Tarrytown, N.Y.

[21] Appl. No.: 750,712

[22] Filed: Jun. 28, 1985

[51] Int. Cl.$^4$ ............................................. G01N 21/85
[52] U.S. Cl. ................................. 250/577; 73/290 V
[58] Field of Search ................... 250/227, 231 R, 551, 250/577; 73/290 V; 367/140, 141

[56] References Cited

U.S. PATENT DOCUMENTS 4,071,753  1/1978  Fulenwider et al. ............ 250/231 R
4,531,406  7/1985  Fritz ................................. 73/290 V Primary Examiner—David C. Nelms
Assistant Examiner—Crystal D. Cooper
Attorney, Agent, or Firm—Dale R. Lovercheck

[57] ABSTRACT

An opto-acoustic fuel quantity gauging system, including: a tank; an ultrasonic energy source; an optical power source; a fiber optic cable; an ultrasonic sensor; an optical detector and a signal conditioning circuit. The ultrasonic energy source is connected to the tank. The ultrasonic energy sensor is connected to the tank. The optical power source is connected to the fiber optic cable. The ultrasonic energy source is connected to the fiber optic cable. The ultrasonic energy sensor is connected to the optical detector by the fiber optic cable. The circuit is connected to the optical detector.

19 Claims, 4 Drawing Figures

OPTO-ACOUSTIC FUEL QUANTITY GUAGING SYSTEM

This invention relates to fuel quantity measurement. It is particulary useful for fuel quantity measurement for aircraft. The invention combines fiber optics and ultrasonics.

An ultrasonic measuring system is difficult to implement due to the requirement for a hardwired interface to each sensor. The wiring presents a hazard within the tank and is difficult to implement, especially for a wing tank, if the sensors are mounted outside the tank.

Many points must be sensed even to achieve a very coarse accuracy. The multifiber optic interconnection at the tank interface becomes unmanageable and very unreliable.

The invention provides remotely located ultrasonic transducers and control electronics powered from a central location over fiber optic tubes or bundles and returning time domain surface reflections from the fuel height by similar fiber optic cables or bundles. The optical power is converted at the transducer with an array of photo detectors, and stored capacitately until a measurement is requested.

BRIEF SUMMARY OF INVENTION

An opto-acoustic fuel quantity gauging system including at least one tank; at least one ultrasonic energy source; at least one ultrasonic energy sensor; and a detector circuit. The ultrasonic energy source is connected to the tank and the ultrasonic energy sensor is connected to the tank. Each ultrasonic energy sensor is connected to the detector by a fiber optic cable. The use of the optic-acoustic system of the invention improves the safety of fuel quantity gauging by elimination of potential spark sources. The opto-acoustic system of the invention also provides improved accuracy in the measurement of fuel quantity.

DETAILED DESCRIPTION OF THE INVENTION

Figure 1:
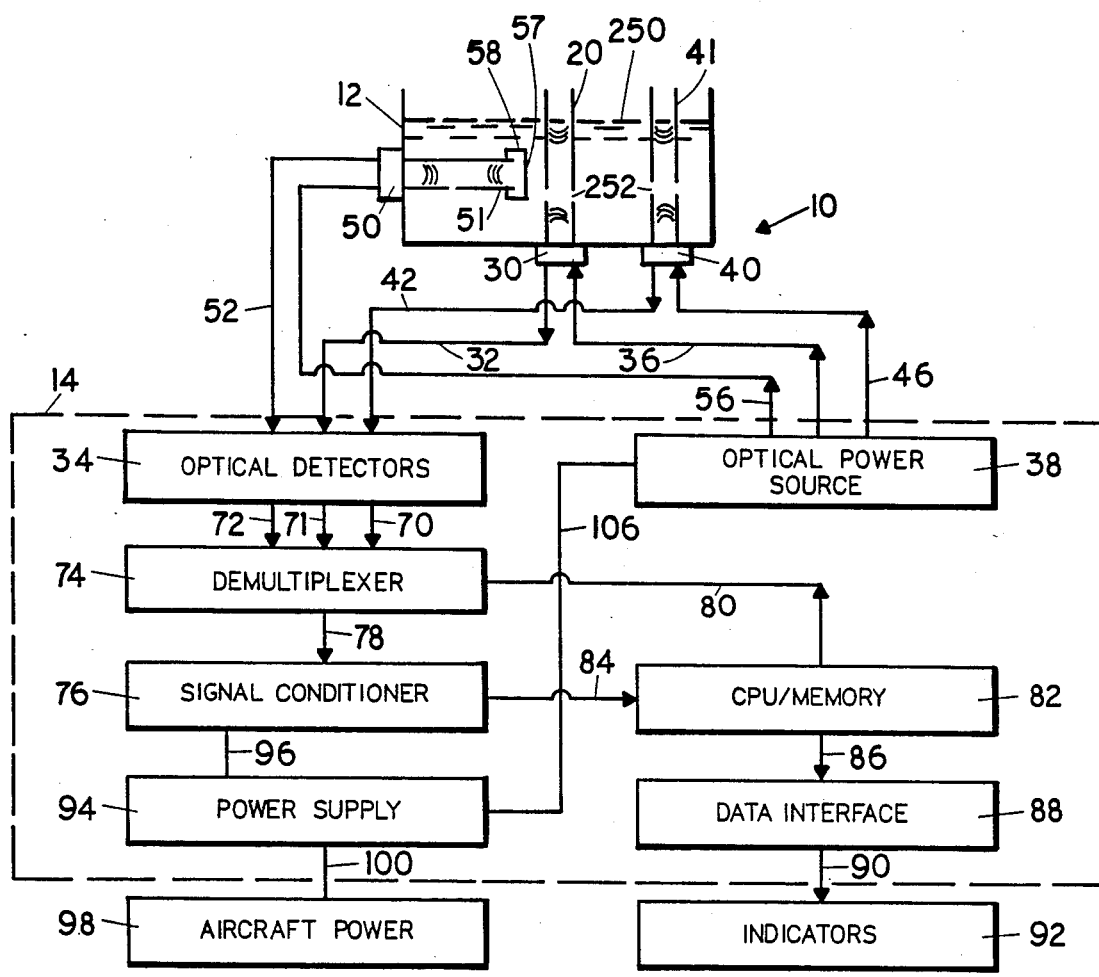
FIG. 1 is a schematic representation of an opto-acoustic fuel quantity gauging system in accordance with the present invention.

The invention uses fiber optics for interfacing to ultrasonic sensors as shown in FIG. 1. The sensor is mounted in a cavity in the lower part of the wing tank. The sensor is easily removed and replaced. The fiber cables are mounted inside the tank and interface through the cavity. The multiplexed control unit transmits a 1 ms pulse which charges the energy source, followed by a short 1 mhz burst (preferably about 10 pulses) to drive the ultrasonic transmitter. The ultrasonic receiver, powered by the energy source, detects the reflected acoustic signal some time later (fraction of a millisecond), and converts the signal to light for transmission through the fiber optic cable back to the multiplexer.

The power dissipated by the sensor electronics is approximately 200 mw peak for the sensor transmit and receives cycles of 10 microseconds. Duty cycle depends on the sensor sample time, or about once every 200 ms in duration.

Fuel level is sensed by transmitting an acoustic signal through the bottom of the tank to the surface of fuel and reflecting the signal back to a receiver. A time reference is measured over a known distance using a velocitometer. By calibrating against the time reference, the level is accurately determined. The fuel density is inferred by measuring the fuel temperature and speed of sound in the fuel determined from the time reference measurement.

An opto-acoustic system for fuel quantity gauging is shown in FIG. 1. The opto-acoustic fuel quantity gauging system 10 includes a tank 12 and a detector circuit 14. The tank 12 is provided with stillwell 20.

The opto-acoustic sensing and transmission system 30 is connected to the tank 12. The opto-acoustic system 30 is connected by a fiber optic cable 32 to the optical detectors 34. The opto-acoustic system 30 receives optical power through fiber optic cable 36 from optical power source 38.

Similarly, opto-acoustic sensing and transmission system 40 is connected to tank 12. Opto-acoustic system 40 is adjacent to stillwell 41. Opto-acoustic system 40 is connected by fiber optic cable 42 to optical detectors 34. Opto-acoustic system 40 is connected by fiber optic cable 46 to optical power source 38. Opto-acoustic sensing and transmission system 50 is connected to tank 12. Discrete level detector opto-acoustic system 50 is adjacent to a stillwell 51. Discrete level detector opto-acoustic system 50 is connected by a fiber optic cable 52 to optical detectors 34. Discrete level detector opto-acoustic system 50 is connected by fiber optic cable 56 to optical power source 38. Reflector 57 is connected to stillwell 51 by brackets 58.

Optical detectors 34 are connected by electrical conductors 70, 71 and 72 to multiplexer 74. Multiplexer 74 is connected to signal conditioner 76 through electrical conductor 78. Multiplexer 74 is connected through line 80 to central processing unit and memory 82. Signal conditioner 76 is connected through line 84 to central processing unit and memory 82. Central processing unit and memory 82 is connected through line 86 to data interface 88. Data interface 88 is connected through line 90 to indicator 92. Electrical current from power supply 94 is received by signal conditioner 76 through line 96. Power supply 94 receives electrical current from the aircraft power supply 98 through line 100.

Figure 2:
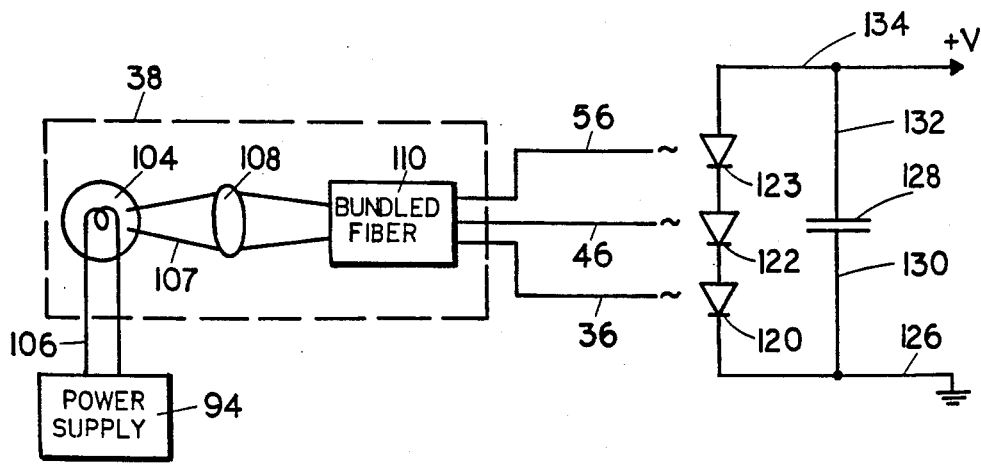
FIG. 2 is a schematic representation of an optical powering circuit for use in accordance with the present invention.

FIG. 2 shows the optical powering from optical power source 38 to the photo diodes 120, 122 and 123. With more particular reference to FIG. 2, the power supply 94 is connected to light bulb 104 by line 106. Light rays 107 from bulb 104 pass through lens 108 and into the bundled fiber ends 110. Optical fiber 36 extends from bundled fiber ends 110 to photo diodes 120. Optical fiber 46 extends from bundled fiber ends 110 to photo diodes 122. Optical fiber 56 extends from bundled fiber ends 110 to photo diode 123. Photo diodes 120, 122 and 123 are connected in series to ground by line 126. Capacitor 128 is connected to ground by line 130. Photo diodes 120, 122 and 123 are connected in parallel to capacitor 128 by lines 132 and 134.

Figure 3:
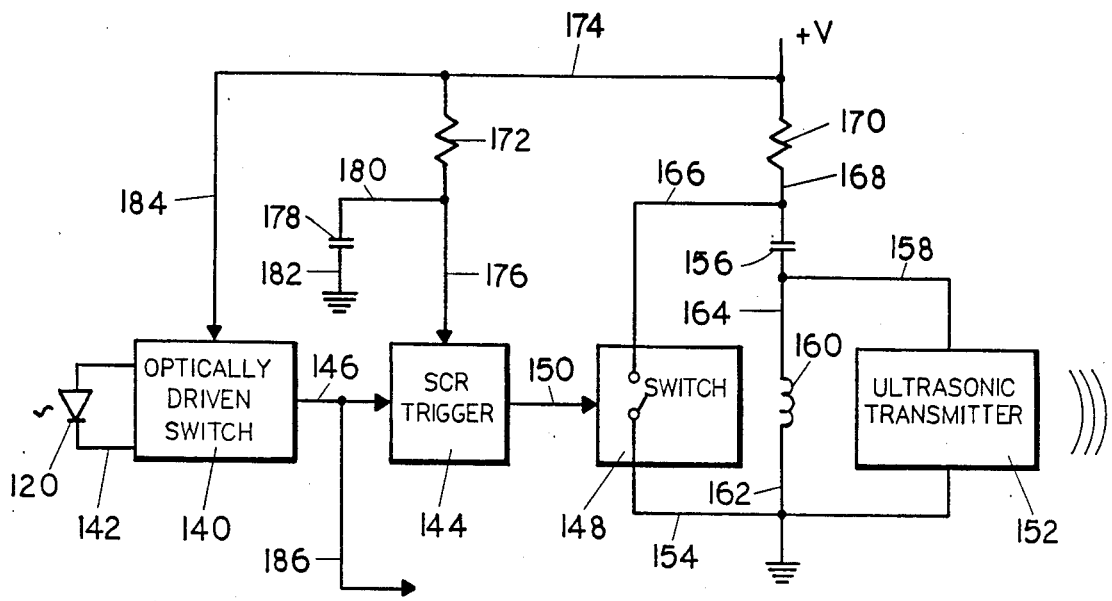
FIG. 3 is a schematic representation of a transmitter triggering and excitation circuit for an opto-acoustic fuel quantity gauging system in accordance with the present invention.
Figure 4:
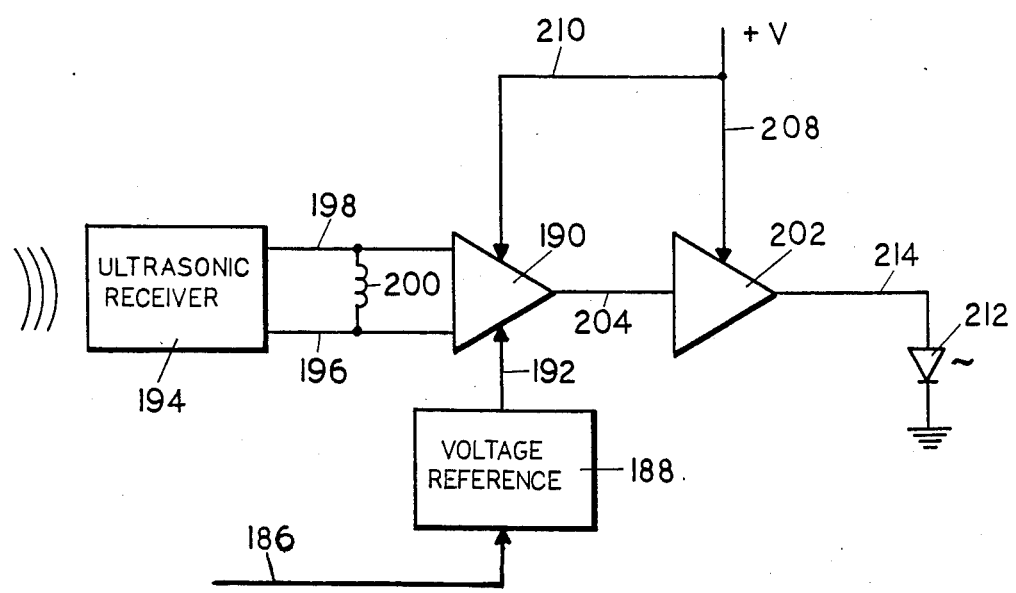
FIG. 4 is a schematic representation of a receiver circuit for use in an opto-acoustic fuel quantity gauging system in accordance with the present invention.

FIG. 3 shows a preferred embodiment of a transmitter triggering and excitation circuit for the opto-acoustic systems 30, 40 and 50. FIG. 4 shows a preferred embodiment of a receiver circuit for the opto-acoustic systems 30, 40 and 50.

With more particular reference to FIG. 3, it would seem that the photo diode 120 is connected to the optically driven switch 140 by line 142. Optically driven switch 140 is connected to SCR trigger 144 by line 146. SCR trigger 144 is connected to high current switch 148 by line 150. High current switch 148 is connected to ultrasonic transducer transmitter 152 by line 154. Ultrasonic transducer transmitter 152 is connected to capacitor 156 by line 158. Conductor 160 is connected in parallel with ultrasonic transducer transmitter 152 by lines 162 and 164. Capacitor 156 is connected through line 166 to high current switch 148. Capacitor 156 is connected to line 168 to resistor 170. Resistor 170 is connected to resistor 172 through line 174. Resistor 172 is connected to SCR trigger 144 through line 176. Resistor 172 is connected to capacitor 178 through line 180. Capacitor 178 is connected to ground through line 182. Resistor 170 and resistor 172 are connected to the optically driven switch 140 through line 184. The optically driven switch 140 is connected through line 186 to voltage reference 188 as shown in FIG. 4. Voltage reference 188 is connected to the amplifier limiter 190 through line 192. The ultrasonic transducer receiver 194 is connected to the amplifier limiter 190 through lines 196 and 198. The inductor 200 is connected to line 196 and line 198. The voltage to current converter 202 is connected to the amplifier limiter 190 through line 204. The voltage to current converter 202 is connected to positive V through line 108. Amplifier limiter 190 is connected to positive V through line 210. The infrared light emitting diode (LED) 212 is connected to voltage to current converter 202 through line 214. Light from infrared LED 212 is transmitted through a fiber optic cable to optical detectors 34.

Ultrasonic waves travel from the opto-acoustic systems 30 and 40 within the stillwells 20 and 41 respectively to fuel surface 250. The waves are reflected from the surface and then travel within the respective stillwells to the respective opto-acoustic system. Ultrasonic waves travel from discrete level detector opto-acoustic system 50 along stillwell 51 to reflector 57. The waves are reflected from reflector 57 and travel along the stillwell 51 to the system 50. When the fuel surface is above the stillwell 51, the waves travel at a velocity associated with the fuel. As the fuel level passes through the stillwell 51, the waves travel at a velocity associated with the fuel and air, until the fuel level is below the stillwell 51. The velocity of the waves in the stillwell is characteristic of the level of fuel.

The stillwells 20, 41 and 51 are preferably provided with apertures 252. This improves the flow of fuel through the stillwell which improves the equilibration of the level of fuel between the tank 12 and the stillwells.

In accordance with the present invention, optically delivered energy is stored in capacitors. A continuous optical power source drives an array of silicone detectors in series to provide capacitor charge voltage. Optical trigger switches are used on transmit burst and receiver signal processing. Signal processing amplifies and compresses the dynamic range of returned ultrasonic signals before modulating the return optical source.

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. An opto-acoustic fuel quantity gauging system, comprising:
   at least one tank means;
   at least one ultrasonic energy source means;
   at least one optical power source;
   fiber optic cable means;
   at least one ultrasonic sensor means;
   an optical detector means and circuit means;
   said ultrasonic energy source means being connected to said tank means; said ultrasonic energy sensor means being connected to said tank means; said optical power source being connected to said fiber optic cable means, each said ultrasonic energy source being connected to said fiber optic cable means, each said ultrasonic energy sensor means being connected to said optical detector means by said fiber optic cable means and said circuit means being connected to said optical detector means.

2. The opto-acoustic fuel quantity gauging system of claim 1 wherein said ultrasonic sensor means comprises a piezoelectric transducer.

3. The opto-acoustic fuel quantity gauging system of claim 1 further comprising computer control means, said computer control means comprising a central processing unit, said central processing unit being connected to each said ultrasonic sensor means.

4. The opto-acoustic fuel quantity gauging system of claim 3 wherein said sensor means comprises a plurality of ultrasonic sensors.

5. The opto-acoustic fuel quantity gauging system of claim 3 wherein said central processing unit is connected to said ultrasonic energy source means.

6. The opto-acoustic fuel quantity gauging system of claim 1 wherein said ultrasonic energy source means and said ultrasonic sensor means comprise a piezoceramic.

7. The opto-acoustic fuel quantity gauging system of claim 3 further comprising indicator means, said indicator means being connected to said central processing unit.

8. The opto-acoustic fuel quantity gauging system of claim 3 further comprising attitude sensor means, said attitude sensor means being connected to said central processing unit.

9. The opto-acoustic fuel quantity gauging system of claim 1 wherein each said ultrasonic energy source means is connected to said detector circuit by said fiber optic cable means.

10. The opto-acoustic fuel quantity gauging system of claim 1 wherein said tank means comprising a tank body member and at least one stillwell, each said stillwell being connected to said tank body member.

11. The opto-acoustic fuel quantity gauging system of claim 10 wherein each said stillwell is provided with apertures adjacent to said tank body member.

12. An opto-acoustic fuel quantity gauging system, comprising:
   at least one tank means;

at least one ultrasonic energy source means;
at least one optical power source;
fiber optic cable means;
at least one ultrasonic sensor means; and
an optical detector means and circuit means;
said tank means comprising a tank body member and at least one stillwell, each said stillwell being connected to said tank body member, each said stillwell having apertures adajcent to said tank body member;
said ultrasonic energy source means being connected to said tank means; said ultrasonic energy sensor means being connected to said tank means;
said optical power source being connected to said fiber optic cable means, each said ultrasonic energy source being connected to said fiber optic cable means, each said ultrasonic energy sensor means being connected to said optical detector means by said fiber optic cable means and said circuit means being connected to said optical detector means.

13. The system of claim 12 wherein said circuit means comprises:
demultiplexer means,
signal conditioner means,
power supply means,
central processing unit means and
indicator means,
said central processing unit means comprising memory means,
said demultiplexer means being connected to said optical detector means and to said signal conditioner means, said signal conditioner means being connected to said power supply means, and to said central processing unit means, said central processing unit means being connected to said indicator means.

14. The system of claim 13 wherein said power supply is connected to said optical power source.

15. The system of claim 12 wherein said ultrasonic energy source is supported within said stillwell by said tank body member.

16. The system of claim 12 wherein
said fiber optic cable means comprises a purality of optical fibers, said purality of optical fibers comprising a first optical fiber means and a second optical fiber means,
sid first optical fiber being connected to said optical power source and to at least one said ultrasonic energy source,
said second optical fiber means being connected to said ultrasonic energy sensor means and to said optical detector means.

17. The system of claim 16 wherein said ultrasonic energy sensor means comprises a light emitting diode.

18. The system of claim 1 wherein
said fiber optic cable means comprises a purality of optical fibers, said purality of optical fibers comprising a first optial fiber means and a second optical fiber means,
said first optical fiber being connected to said optical power source and to at lest one said ultrasonic energy source,
said second optical fiber means being connected to said ultrasonic energy source means and to said optical detector means.

19. The system of claim 18 wherein said ultrasonic energy sensor means comprises a light emitting diode.

\* \* \* \* \*

UNITED STATES PATENT AND TRADEMARK OFFICE
CERTIFICATE OF CORRECTION

PATENT NO. : 4,677,305
DATED : June 30, 1987
INVENTOR(S) : S. Michael Ellinger

It is certified that error appears in the above-identified patent and that said Letters Patent is hereby corrected as shown below:

Column 6, line 13 "sid"

should read -- said --

Signed and Sealed this

Twenty-second Day of December, 1987

Attest:

DONALD J. QUIGG

Attesting Officer     Commissioner of Patents and Trademarks